E. H. MERRILL.
Wagon-Seat Spring.
No. 200,147. Patented Feb. 12, 1878.
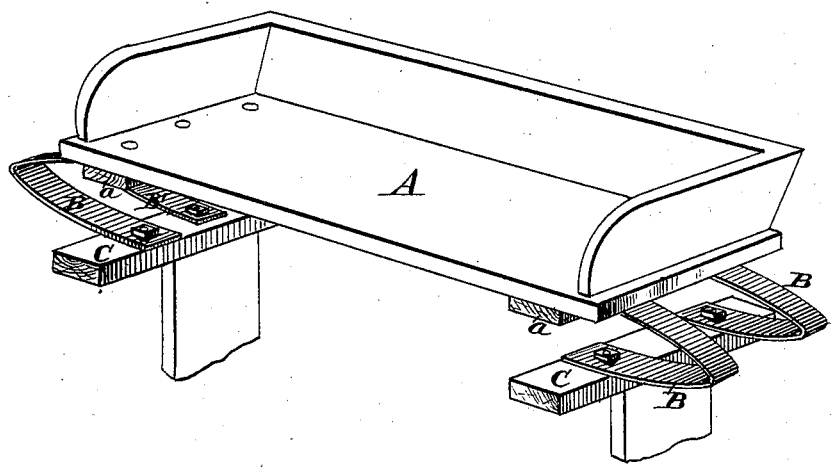
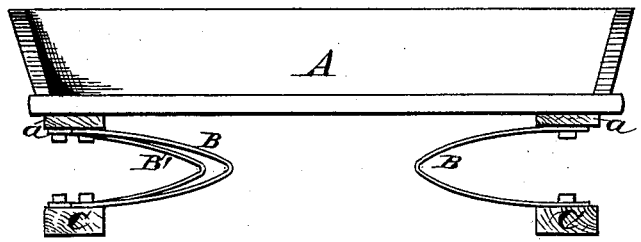
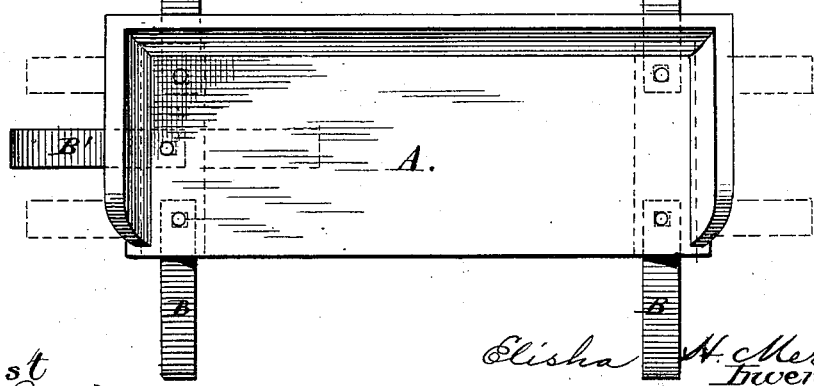

UNITED STATES PATENT OFFICE.

ELISHA H. MERRILL, OF WINSTED, CONNECTICUT, ASSIGNOR OF ONE-HALF HIS RIGHT TO LYMAN W. CASE, OF SAME PLACE.

IMPROVEMENT IN WAGON-SEAT SPRINGS.

Specification forming part of Letters Patent No. 200,147, dated February 12, 1878; application filed January 2, 1878.

*To all whom it may concern:*

Be it known that I, ELISHA H. MERRILL, of Winsted, in the county of Litchfield, in the State of Connecticut, have invented a new Improvement in Springs, fully described in this specification.

The object of my invention is to make a spring at slight cost, which may be readily duplicated or substituted, and which can be easily reversed, turned out of the way, or into different positions.

My invention consists in a half-spring the ends of which are attached in place by a single bolt and nut, so that it can be quickly set or removed and readily adjusted in different positions.

In the drawing, Figure 1 is a perspective view, Fig. 2 a side elevation, and Fig. 3 a plan view.

My invention is shown as applied to a wagon-seat; but it may be used upon vehicles generally, or in any place where springs are desirable for safety and comfort.

The seat A rests upon four or more half-springs, B B′, held in place by common bolts *a*, made of easy fit, so that the position of the springs can be reversed or altered at pleasure.

My spring is made of a single leaf or plate of steel, or any other material suitable for the purpose, and its flexibility and thickness may be graduated as desired. The plate is bent at a central or convenient point into a V-shape; but each arm may be curved like a half-ellipse. The ends of each leaf are punctured with the proper holes.

The spring is manufactured—the rolling, forging, and bending—in the usual way, the novelty of the invention being a half-spring, so mounted as to be reversible or easily changeable into different positions.

The half-springs may set in line, so as to resemble the ordinary carriage-spring; or they may be turned outwardly, as in Fig. 1, or inwardly, as in Fig. 2; and being loosely mounted and changeable, additional half-springs may be used without inconvenience for equalization of weight.

The spring is cheaply and quickly made. It has no joints. It is easily substituted if one breaks. Several half-springs may be used, and they will not be in the way of each other, as they may be turned about at pleasure.

I am aware that a half-spring, or a semi-elliptic spring, or a half-spring made out of a single piece of flat metal, is not new; and I distinctly disclaim the same as my invention.

What I claim as new, and desire to secure by Letters Patent, is—

A half-spring the ends of which are attached in place by a single pivotal bolt, substantially as and for the purposes described.

In testimony whereof I hereunto subscribe my name and affix my seal, in the presence of two attesting witnesses, this 31st day of December, 1877.

ELISHA H. MERRILL. [L. S.]

Witnesses:
HENRY M. SWEET,
OLIVER W. MERRILL.